United States Patent
Dashevsky et al.

(10) Patent No.: US 12,033,018 B2
(45) Date of Patent: *Jul. 9, 2024

(54) ELECTRONIC DEVICES WITH OPTICAL IDENTIFICATION SENSOR

(71) Applicant: Apple Inc., Cupertino, CA (US)

(72) Inventors: David D. Dashevsky, San Jose, CA (US); Brian S. Pearson, San Francisco, CA (US); Dong Zheng, Los Altos, CA (US); Eugene C. Cheung, Redwood City, CA (US); Kenneth J. Vampola, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,228

(22) Filed: Aug. 8, 2023

(65) Prior Publication Data

US 2023/0385591 A1    Nov. 30, 2023

Related U.S. Application Data

(63) Continuation of application No. 17/469,673, filed on Sep. 8, 2021, now Pat. No. 11,763,126.

(51) Int. Cl.
*G06K 19/077*    (2006.01)
*G06K 7/10*    (2006.01)
(Continued)

(52) U.S. Cl.
CPC .......... *G06K 19/07762* (2013.01); *G06K 7/12* (2013.01); *G09F 3/005* (2013.01); *G06K 2007/10485* (2013.01)

(58) Field of Classification Search
None
See application file for complete search history.

(56) References Cited

U.S. PATENT DOCUMENTS 6,375,075 B1    4/2002    Ackley et al.
11,763,126 B2 *    9/2023    Dashevsky ............. G09F 3/005
                                                        235/492

(Continued)

FOREIGN PATENT DOCUMENTS

EP    0886958 B1    4/2001
WO    2017049507 A1    3/2017
(Continued)

*Primary Examiner* — Kristy A Haupt
(74) *Attorney, Agent, or Firm* — Treyz Law Group, P.C.; Jason Tsai; Jinie M. Guihan (57) ABSTRACT

An electronic device may be attached to an external item. The electronic device may include an optical identification sensor configured to sense a color-encoded tag in the external item when the item is attached to the device. The optical identification sensor may include a board layer, a protective filter layer, wall structures for supporting the protective filter layer on the board layer, a linear array of photodetectors disposed between the board layer and the protective filter layer, a field-of-view restriction filter interposed between the photodetectors and the protective filter layer, and a light source having multiple emitters for illuminating the color-encoded tag. The emitters may be activated sequentially to produce multiple images that are combined to reconstruct an accurate reading of the color-encoded tag, which can then be used to identify the type of external item currently attached to the electronic device.

20 Claims, 10 Drawing Sheets

(51) Int. Cl.
   *G06K 7/12* (2006.01)
   *G09F 3/00* (2006.01)

(56) References Cited

U.S. PATENT DOCUMENTS

| | | |
|---|---|---|
| 2006/0242875 A1 | 11/2006 | Wilson et al. |
| 2008/0236011 A1 | 10/2008 | Bekker |
| 2010/0008552 A1* | 1/2010 | Shin .................. G06V 40/1394 |
| | | 382/124 |
| 2012/0170284 A1 | 7/2012 | Shedletsky |
| 2017/0147918 A1 | 5/2017 | Karani et al. |
| 2020/0410201 A1 | 12/2020 | Nilsson et al. |

FOREIGN PATENT DOCUMENTS

| | | |
|---|---|---|
| WO | 2017211152 A1 | 12/2017 |
| WO | 2019066226 A1 | 4/2019 |

* cited by examiner

ELECTRONIC DEVICES WITH OPTICAL IDENTIFICATION SENSOR

This application is a continuation of patent application Ser. No. 17/469,673, filed Sep. 8, 2021, which is incorporated by reference herein in its entirety.

FIELD

This relates generally to electronic devices, and, more particularly, to electronic devices with sensors.

BACKGROUND

Electronic devices often include components that have sensors. For example, earbuds, cellular telephones, wristwatches, and other portable devices sometimes have light-based components.

A user may decide to mate these electronic devices to one or more items. In one scenario, a removable strap can be attached to a wristwatch. In another scenario, a removable case can be attached to a cellular telephone. It can be challenging to design light-based sensors that can properly identify the type of such items when they are attached to an electronic device.

SUMMARY

An electronic device may be attached to or mated with an external item. The external item may be provided with a passive identification tag such as a color-coded tag having a linear array of color blocks. The electronic device may have a housing, a display in the housing, and an optical identification sensor for sensing the color-coded tag within the external item to determine a unique identifier for that item.

In accordance with some embodiments, the optical identification sensor can include a light source configured to emit light that illuminates the external item, an array of photodetectors configured to receive the light reflecting back from the external item through a portion of the housing, and a field-of-view restriction filter configured to establish a field of view for each photodetector in the array of photodetectors as the photodetectors receive the light reflecting back from the external object through the field-of-view restriction filter. The field-of-view restriction filter can be an opaque layer having multiple through holes. Each of the through holes can have a diameter and a height that is greater than the diameter. The field of view of the field-of-view restriction filter can have a field-of-view angle that is less than 10°. The optical identification sensor can include a presence sensor configured to detect when the external item is attached to the electronic device. The optical identification sensor and the external object can be separated by a distance that is less than 5 millimeters when the external object is attached to the electronic device. The light source can include a first emitter configured to emit light in a first range of wavelengths, a second emitter configured to emit light in a second range of wavelengths different than the first range of wavelengths, and a third emitter configured to emit light in a third range of wavelengths different than the first and second ranges of wavelengths. The optical identification sensor can further include a light diffusing layer disposed over the first, second, and third emitters.

In accordance with some embodiments, the optical identification sensor can include: a light source configured to emit light, through a portion of the housing, for illuminating the color-coded tag in the external item; a field-of-view restriction filter; and a linear array of photodetectors configured to receive the light reflecting back from the color-coded tag in the external item through the portion of the housing and through the field-of-view restriction filter. The light source can include multiple emitters of different wavelengths. The electronic device can include control circuitry configured to sequentially activate the emitters to acquire corresponding images using the photodetectors. The optical identification sensor can further include a light scattering layer over the emitters. The control circuitry can further be configured to combine the images to detect edges of each of the color blocks, identify a location for each of the color blocks, determine a dominant color for each of the color blocks, and output a unique identifier for the external item based on the dominant color of each of the color blocks.

In accordance with some embodiments, the optical identification sensor can be a lensless optical identification assembly having a light source configured to emit light that illuminates the external item mated with the electronic device, an angular filter having openings, and an array of photodetectors configured to receive the light reflecting back from the external item through the openings of the angular filter but without passing through a lens. The light source can include multiple emitters that are sequentially activated to acquire corresponding images using the array of photodetectors. The lensless optical identification assembly can further include a diffusive light pipe over the emitters.

DETAILED DESCRIPTION

Electronic devices may be provided with light-based components. The light-based components may include, for example, light-based (optical) sensors. An optical sensor may have a light source with separately addressable light-emitting elements and may have an array of photodetectors for sensing light from the light source reflecting back from an external item that has been mated with an electronic device. The optical sensor is a lensless sensor having a narrow field-of-view filter for creating a 1:1 scale image of a color-coded tag in the external item on the array of photodetectors. Unlike typical camera (lens) based sensors, an optical sensor configured in this way can be used to accurately read the color-coded tag in the external item at shorter distances and can be made thinner with less cost.

Figure 1:
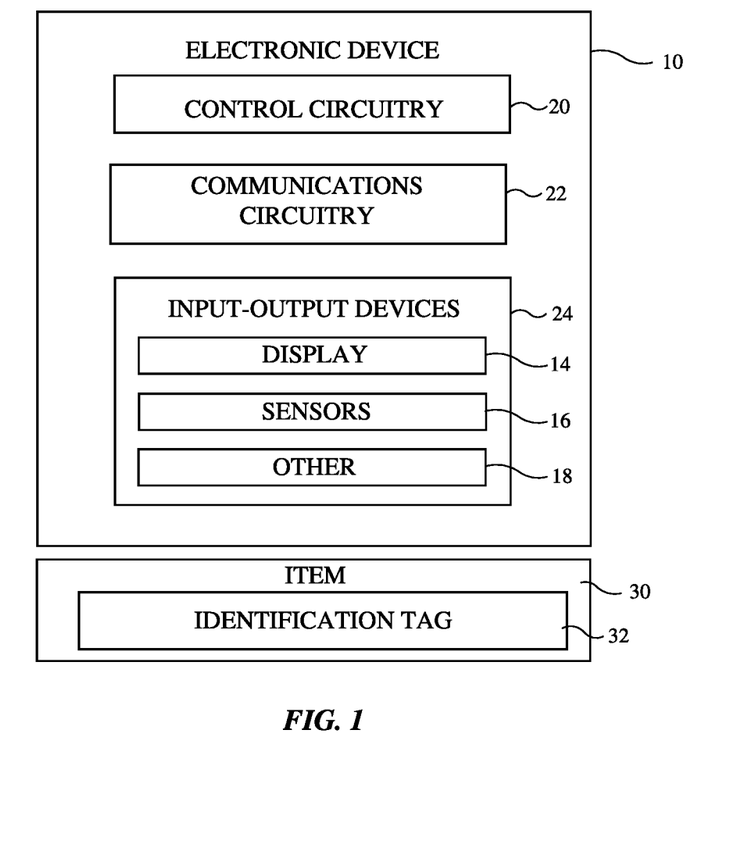
FIG. 1 is a schematic diagram of an illustrative electronic device and an external item that can be removably attached to the electronic device in accordance with some embodiments.

A schematic diagram of an illustrative electronic device having a display is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment. Configurations in which device 10 is a wristwatch, cellular telephone, or other portable electronic device may sometimes be described herein as an example. This is illustrative. Device 10 may, in general, be any suitable electronic device with a display.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry (wireless transceiver circuitry), and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display or microLED display are sometimes described herein as an example.

Display 14 may have an array of pixels configured to display images for a user. The pixels may be formed on display panels formed from rigid and/or flexible display panel substrates. One or more additional substrates, which may sometimes be referred to as interconnect substrates, may include interconnects (signal paths) for distributing power and other signals to the display panel(s). In an illustrative configuration, one or more display panels may be mounted to a flexible interconnect substrate so that display panel contacts mate with corresponding interconnect substrate contacts, thereby electrically connecting the interconnects of the display panel(s) to the interconnects of the interconnect substrate. The flexibility of the interconnect substrate allows the interconnect substrate to conform to curved display surfaces.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors.

In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

As shown in FIG. 1, electronic device 10 may be brought into contact or mated with an external item such as item 30. In certain embodiments, it may be desirable for electronic device 10 to identify a type of item 30 that has been attached to device 10. Item 30 may include an identification tag such as tag 32 that can be detected using one or more sensors 16 within device 10. Identification tag 32 may be a code tag such as a color-coded (color-encoded) tag or other passive identification tag. In contrast to conventional monochrome (black-and-white only) barcodes, the use of a color tag 32 encodes information in different wavelengths and enables reading the encoded information using discrete wavelength illumination. Reading an identification tag in this way can provide improved occlusion insensitivity (e.g., for when a portion of tag 32 is blocked by dust or other interfering particles) and improved damage insensitivity (e.g., for when a portion of tag 32 has been scratched off, has some manufacturing defect, or has otherwise been damaged).

In one embodiment, electronic device 10 may include an optical sensor 16 configured to sense color-coded tag 32 when external item 30 has been brought into close proximity with device 10. In the mated state, optical sensor 16 of electronic device 10 and tag 32 of external item 30 may be separated by a distance D. Distance D may be equal to 1 mm, 2 mm, 3 mm, 0.5-3 mm, less than 0.5 mm, less than 1 mm, less than 2 mm, less than 3 mm, less than 4 mm, less than 5 mm, 1-10 mm, etc. Optical sensor 16 has to be capable of sensing tag 32 at such short distances.

Figure 2:
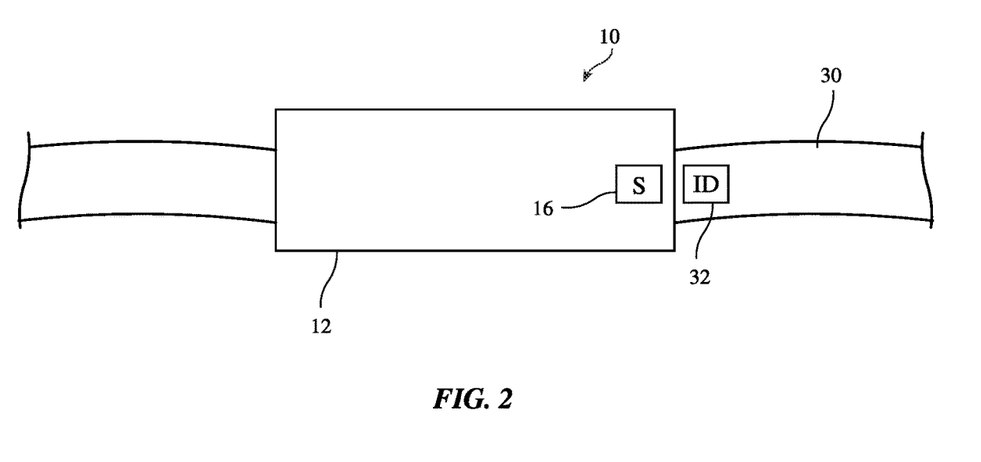
FIG. 2 is a side view of an illustrative wristwatch and a removable strap in accordance with some embodiments.

FIG. 2 illustrates one suitable embodiment where electronic device 10 is a wristwatch configured to be worn on a wrist of a user. As shown in FIG. 2, wristwatch 10 may be removably coupled to a band such as band (external item) 30. Band 30, which may sometimes be referred to as a strap, wrist strap, watch strap, wrist band, or watch band, may be used to secure the wristwatch device 10 to the wrist of a user. Wristwatch 10 may include an optical sensor 16 configured to identify band 30 by sensing identification tag 32 when band 30 is brought into close proximity with wristwatch 10. By sensing identification tag 32, wristwatch 10 can determine a unique identifier indicative of the type of wrist band, the color of the wrist band, the material of the wrist band, etc. Optical sensor 16 of this type is therefore sometimes referred to as an optical identification sensor.

Figure 3:
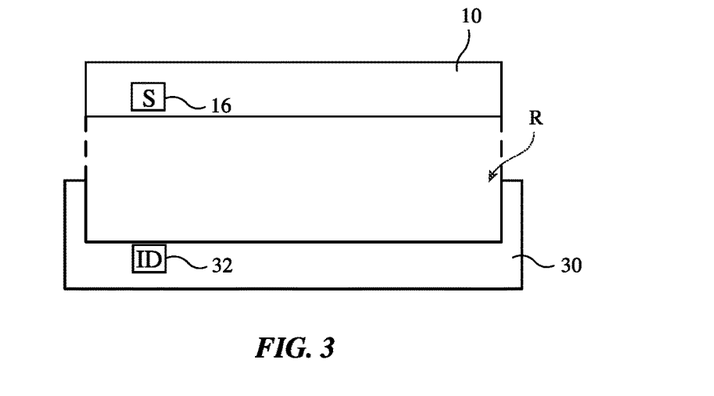
FIG. 3 is a side view of an illustrative electronic device and a removable case in accordance with some embodiments.

FIG. 3 illustrates another suitable embodiment in which electronic device 10 is a cellular telephone. As shown in FIG. 3, cellular telephone 10 may be removably inserted into a case such as case (external item) 30. Case 30, which may have a recess R configured to receive device 10, can be used to provide protection and/or can be used to charge device 10 (e.g., in the scenario which case 30 is a battery case). Cellular telephone 10 may include an optical sensor 16 configured to identify case 30 by sensing identification tag 32 when case 30 is brought into close proximity with cellular telephone 10. By sensing identification tag 32, cellular telephone 10 can determine a unique identifier indicative of the type of case, the color of the color, the material of the case, etc. Optical sensor 16 of this type is therefore sometimes referred to as an optical identification sensor.

The examples of FIGS. 2 and 3 in which electronic device 10 is a wristwatch or a cellular telephone and in which external item 30 is a wrist band or a case is merely illustrative. In general, electronic device 10 can be any portable electronic device or computer and item 30 can be any external item or accessory that can be mated to or removably attached to device 10.

Figure 4:
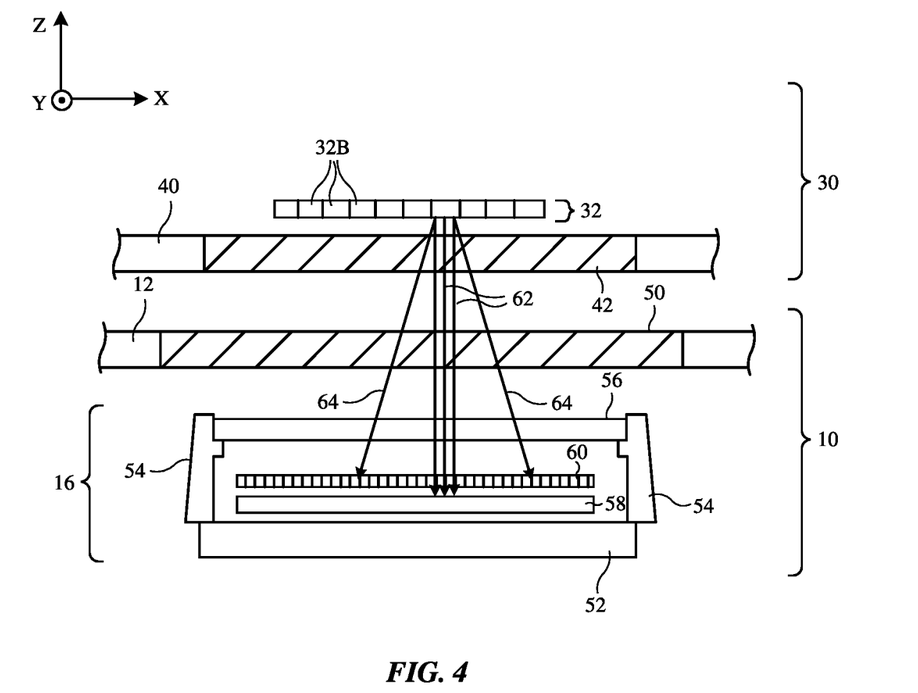
FIG. 4 is a cross-sectional side view of an illustrative electronic device having an optical identification sensor configured to identify an external item with a color-coded tag in accordance with some embodiments.

FIG. 4 is a cross-sectional side view showing item 30 that has been brought into close proximity with electronic device 10. As shown in FIG. 4, item 30 has a housing (enclosure) 40 and identification tag 32 disposed within house 40. Identification (ID) tag 32 may be a code tag such as a color-coded (color-encoded) tag or other passive identification marker or badge. Illustrative configurations in which tag 32 is a color-encoded tag are sometimes described herein as an example.

Color-coded tag 32 may include an array of color blocks such as blocks 32B printed on a substrate such as a reflective or diffused substrate. The substrate can be a sheet of polymer (as an example). Each color block 32B may include one or more pigments responsive to different wavelengths ink printed onto the tag substrate. For example, the pigments can be color pigments that reflect wavelengths in the visible spectrum (e.g., from about 400 nm to 700 nm) or infrared pigments that reflect wavelengths in the near infrared spectrum (e.g., around 740-1100 nm).

In the example of FIG. 4, tag 32 may include some combination of color blocks 32B such as red (R) blocks, blue (B) blocks, green (G) blocks, red-blue (RB) blocks, red-green (RG) blocks, and/or blue-green (BG) blocks. Each permutation of these six colors represents a unique color identifier code. An exemplary tag 32 having 10 color blocks (as shown in FIG. 4) can encode up to around 60 million (i.e., 6^10) unique identifier codes. This is merely illustrative. In another example where tag 32 has nine color blocks each of which can be one of six possible colors (e.g., R, G, B, RB, RG, or BG), such tag can encode up to around 10 million (i.e., 6^9) unique identifier codes. In general, tag 32 should include a sufficient number of color blocks with pigments to encode at least a hundred thousand codes, at least a million codes, at least ten million codes, etc.

If desired, some color blocks may be white blocks (i.e., blocks that reflect all visible wavelengths) or black blocks (i.e., blocks that reflect none of the visible wavelengths). The codes can optionally include error correction features such as checksum information, cyclic redundancy checking (CRC) information, and error correcting code (ECC) information at the expense of address space. Tag 32 configured in this way can be manufactured with relatively low cost while encoding a high density code that is insensitive to occlusion, scratch, and misalignment. In another suitable embodiment, tag 32 may include some combination of color blocks 32B such as cyan (C) blocks, magenta (M) blocks, yellow (Y) blocks, cyan-magenta (CM) blocks, cyan-yellow (CY) blocks, and/or magenta-yellow (MY) blocks.

Color-coded tag 32 may be disposed behind a portion of housing 40 such as behind a protective cover layer 42.

Protective cover layer 42 may be tinted black or with other opaque color and may be otherwise patterned to cosmetically obfuscate tag 32 so tag 32 is hidden from the user's view. Protective cover layer 42 may be formed from glass, sapphire, polymers, and/or other transmissive layer that is sufficiently transparent to the wavelengths associated with the pigments printed on tag 32.

Referring still to FIG. 4, device 10 may include a housing (enclosure) 12 and an optical identification sensor 16 disposed within housing 12. Optical identification sensor 16 may be configured to sense color-coded tag 32 when item 30 is brought into close proximity with device 10. For example, when item 30 is mated with or attached to device 10, optical identification sensor 16 and tag 32 may only be separated by less than 1 mm, less than 2 mm, less than 3 mm, less than 4 mm, less than 5 mm, 1-4 mm, 1-10 mm, etc. Optical identification sensor 16 may be disposed behind a portion of housing 12 such as behind an aperture window 50. Aperture window 50 may be tinted black or with other opaque color and may be otherwise patterned to cosmetically obfuscate any underlying component (e.g., so that optical identification sensor 16 is hidden from the user's view). Window layer 50 may be formed from glass, sapphire, polymers, and/or other transmissive layer that is at least partially or sufficiently transparent to the wavelengths of interest (i.e., wavelengths associated with the pigments printed on color tag 32). Window 50 may have a transmissivity of at least 1%, at least 10%, at least 20%, at least 30%, at least 40%, at least 50%, 50-90%, or up to 99% for the wavelengths of interest.

Optical identification sensor 16 may include a carrier layer such as printed circuit board 52, a linear (one dimensional) array of photodetectors 58 on layer 52, a field-of-view (FoV) restriction filter such as FoV restriction filter 60 disposed over photodetector array 58, an additional filter layer such as filter layer 56 disposed over FoV restriction filter 60, and walls 54 supporting filter 56 and enclosing components 58 and 60 within sensor 16. Sensor 16 assembled in this way is sometimes referred to as an optical identification module or optical identification assembly. Filter layer 56 may be a glass, polymer, or other transparent layer that serves as a protective layer for the optical sensor module. If desired, filter layer 56 can be configured to selectively filter out wavelengths outside the range(s) of interest.

Figure 5:
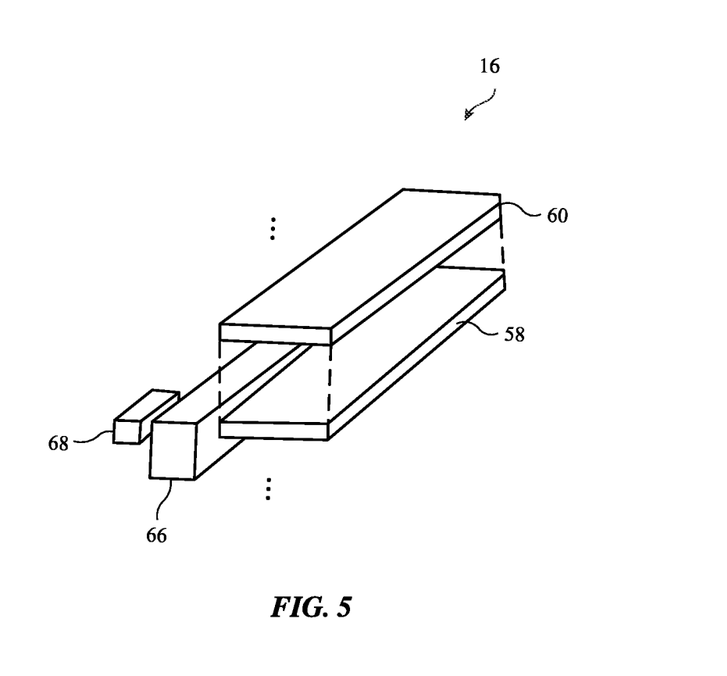
FIG. 5 is an exploded perspective view of an illustrative optical identification sensor in accordance with some embodiments.

Optical identification sensor 16 may include additional components (not shown in the cross-sectional side view of FIG. 4). FIG. 5 shows an exploded perspective view of at least some of the internal components within sensor 16. As shown in FIG. 5, sensor 16 includes FoV restriction filter 60 disposed over photodetector array 58 (as described above in connection with FIG. 4) and may further include a light source such as light source 66 and a separate item presence sensor such as sensor 68. Light source 66 need not and should not be covered by FoV restriction filter 60.

Sensor 68 may have an emitter that emits short infrared or color pulses and an associated detector to measure a corresponding amount of reflected light to identify when item is mated with device 10. Sensor 68 may generate pulses at a frequency of 0.01 Hz to hundreds of kilohertz to determine the presence of item 30 or the presence of color-coded tag 32. Presence sensor 68 operated in this way may sometimes be referred to as a proximity sensor. The use of a separate dedicated item presence sensor 68 is merely illustrative. If desired, light source 66 can also be used as the requisite emitter while array 58 can serve as the detector to determine whether item 30 has been mated with device 10. This can help obviate the need for a separate proximity sensor 68 within optical identification sensor 16.

In one suitable embodiment, light source 66 can include one or more broadband white light-emitting diodes or lasers (e.g., a vertical-cavity surface-emitting laser or VCSEL). This is merely illustrative. In other suitable embodiments, light source 66 may include color light-emitting diodes (LEDs) or lasers (e.g., VCSELs). Illustrative device configurations in which optical identification sensor 16 is provided with color light-emitting elements are sometimes described herein as an example.

Figure 6:
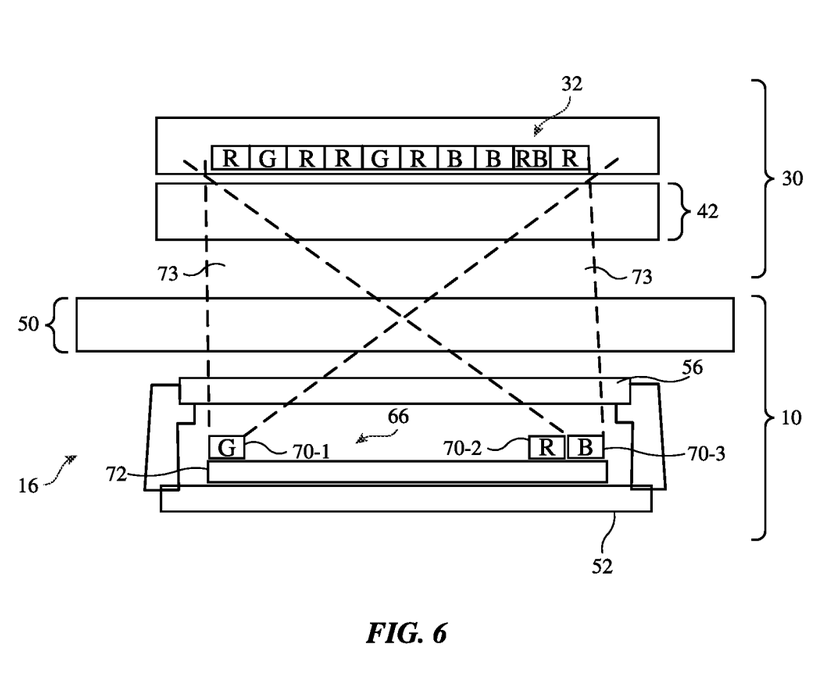
FIG. 6 is a cross-sectional side view showing an illustrative optical identification sensor having a light source configured to illuminate a color-coded tag in an external item in accordance with some embodiments.

FIG. 6 shows one example in which optical identification sensor 16 includes multiple individually addressable color LEDs (or lasers) configured to emit light for illuminating color tag 32. The wavelengths of these color LEDs should be selected based on the color blocks in tag 32. In the example of FIG. 6, tag 32 includes color blocks formed using green, red, and blue pigments. In such scenarios, light source 66 should include a green (G) emitter 70-1 that emits green light, a red (R) emitter 70-2 that emits red light, and a blue (B) emitter 70-3 that emits blue light. The emitters 70 may be mounted on a support layer such as support layer 72. Each emitter should have a sufficiently wide enough emission coverage to properly illuminate every color block in tag 32 (as shown by emission coverage 73). If desired, the intensity of each emitter 70 can be modulated with one or more unique modulation frequency in order to improve ambient light rejection and/or to reduce interference from other electromagnetic sources.

These color emitters can be activated in sequence (i.e., one after another) to acquire three corresponding images using the array of photodetectors. For example, blue emitter 70-3 can be turned on during a first period to acquire a first 1D image based on reflection from the blue emitted light, green emitter 70-1 can be turned on during a second period following the first period to acquire a second 1D image based on reflection from the green emitted light, and red emitter 70-2 can be turned on during a third period following the second period to acquire a third 1D image based on reflection from the red emitted light. Additional processing circuitry within device 10 (e.g., control circuitry 20 of FIG. 1) may reconstruct an accurate image of color tag 32 based on the three sequentially acquired images.

Figure 7:
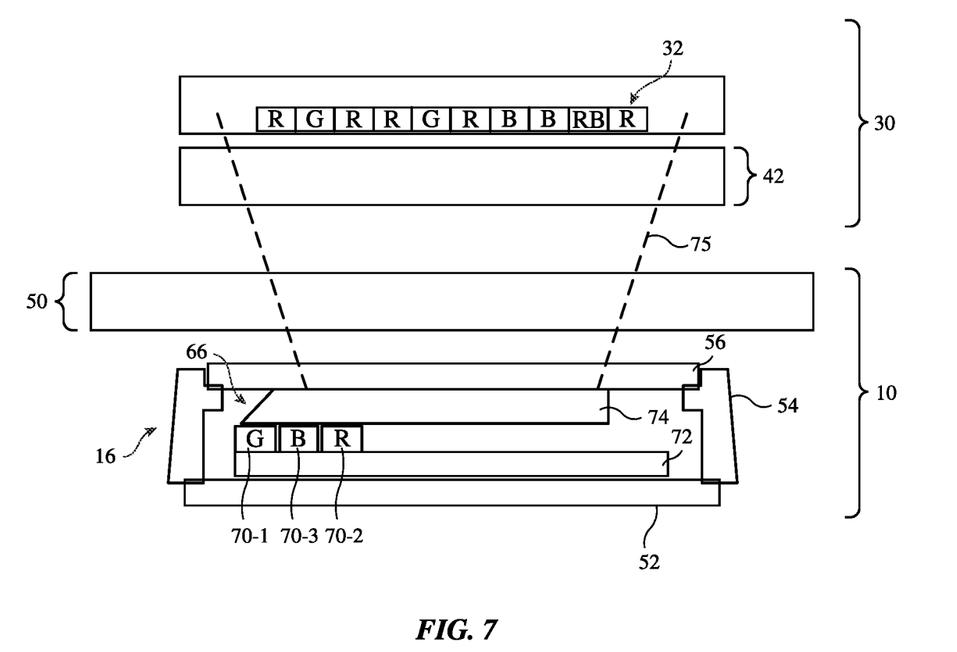
FIG. 7 is a cross-sectional side view showing an illustrative optical identification sensor having a light source configured to illuminate, using a light diffuser, a color-coded tag in an external item in accordance with some embodiments.

The example of FIG. 6 in which the color emitters each have a wide angle of coverage is merely illustrative. FIG. 7 illustrates another suitable embodiment in which light source 66 is provided with a light diffusing or scattering layer such as light diffusing layer 74. Light diffusing (or scattering) layer 74 can be a diffusive light pipe (as an example). Light diffusing layer 74 is interposed between filter 56 and emitters 70. Light diffusing layer 74 is capable of producing a broad emission coverage (as shown by emission coverage 75) without requiring the individual emitters 70 to have a wide emission output.

Similar with the example of FIG. 6, the color emitters of FIG. 7 can be activated in sequence to acquire three corresponding images using the array of photodetectors. For example, green emitter 70-1 can be turned on during a first period to acquire a first 1D image based on reflection from the green emitted light, blue emitter 70-3 can be turned on during a second period following the first period to acquire a second 1D image based on reflection from the blue emitted light, and red emitter 70-2 can be turned on during a third period following the second period to acquire a third 1D image based on reflection from the red emitted light. Additional processing circuitry within device 10 (e.g., control circuitry 20 of FIG. 1) may reconstruct an accurate image of color tag 32 based on the three sequentially acquired images.

The examples described above in connection with FIGS. 6 and 7 in which light source 66 has individually addressable color emitters of different wavelengths is merely illustrative. In other suitable embodiments, color filters can be added on top of the array of photodetectors to obviate the need for emitters of different colors (wavelengths).

Referring back to FIG. 4, field-of-view (FoV) restriction filter 60 may be used to establish or limit the field of view of each photodetector within array 58 by selectively passing through light rays that are substantially parallel to the surface normal of housing 12 (e.g., the emitted light rays reflecting back from tag 32, as shown by arrows 62 that are parallel or almost parallel to the Z axis). Reflecting light rays such as light rays 64 that are not substantially parallel to the housing surface normal (e.g., non-parallel light rays with an angle of divergence of greater than 1°, 2°, 3°, 5°, 10°, 2-20°, or other suitable threshold degree) will be rejected or filtered out by field-of-view restriction filter 60.

Figure 8:
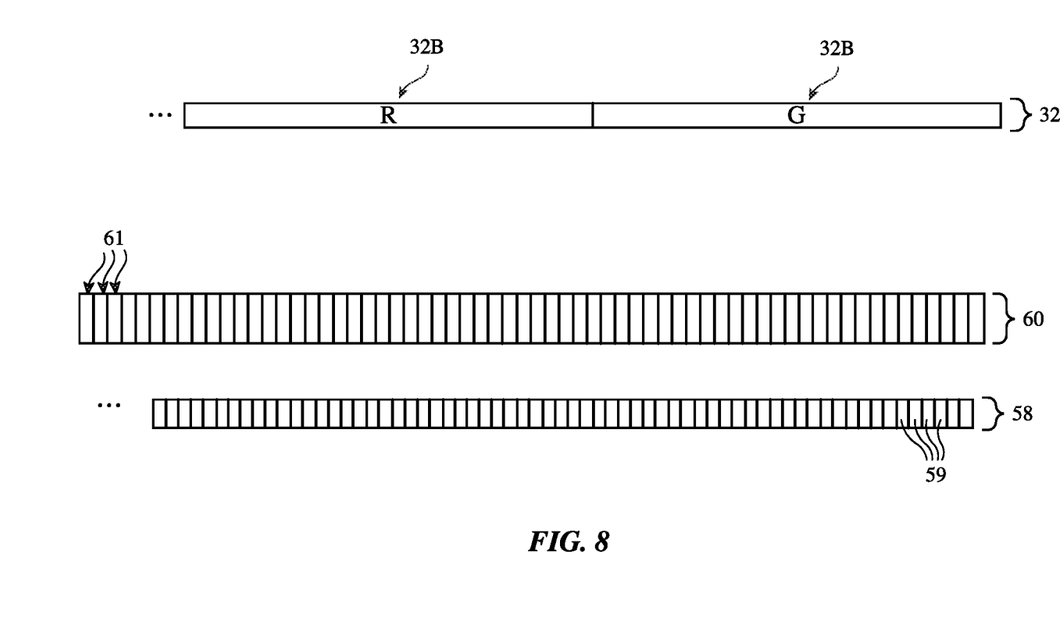
FIG. 8 is a cross-sectional side view showing more details of an illustrative optical identification sensor in accordance with some embodiments.

FIG. 8 shows a more detailed view of FoV restriction filter 60 relative to color tag 32 and photodetector array 58 (e.g., a linear array of individual photodetectors 59). As shown in FIG. 8, each color block 32B within tag 32 may be overlapped by more than five photodetectors 59 in the array when item 30 is mated with device 10. If desired, each color block 32B within tag 32 may be overlapped by more than ten photodetectors 59. Array 58 may include a linear array of 1-by-n photodetectors 59, where n can be at least 20, at least 50, at least 100, at least 200, hundreds, or even thousands of photodetectors 59. The photodetectors 59 in array 58 can be photodiodes formed using the complementary metal-oxide-semiconductor (CMOS) process, charge-coupled devices (CCDs), or other types of semiconductor photosensitive elements.

Optical identification sensor 16 need not include any color filters or lens over photodiodes 59. Photodetector array 58 is therefore sometimes referred to as a monochrome sensor array. Optical identification sensor 16 is therefore sometimes referred to as a lensless sensor. A lensless and color-filter-less optical identification sensor of this type exhibits a reduced height and footprint compared to conventional camera/imaging sensors having color filters and lenses formed over a two-dimensional array of photodiodes. Such type of optical sensor assembly is therefore more compact and is a more cost-effective solution for mobile devices.

Field-of-view restriction filter 60 is disposed over photodetector array 58. FoV restriction filter 60 may be a layer with an array of holes (through holes, slots, louvers, or openings) 61 that allow light to travel through to the underlying photodetectors 59. In one suitable arrangement, the array of holes 61 in filter 60 may be more dense than the array of photodetectors (i.e., each photodetector 59 can be overlapped by more than one of the holes 61). In another one suitable arrangement, the array of holes 61 in filter 60 may be less dense than the array of photodetectors (i.e., each hole 61 can be overlapped by more than one photodetector 59). In yet another suitable arrangement, each hole 61 in filter 60 can correspond to exactly one respective photodetector 59 in the array.

Figure 9:
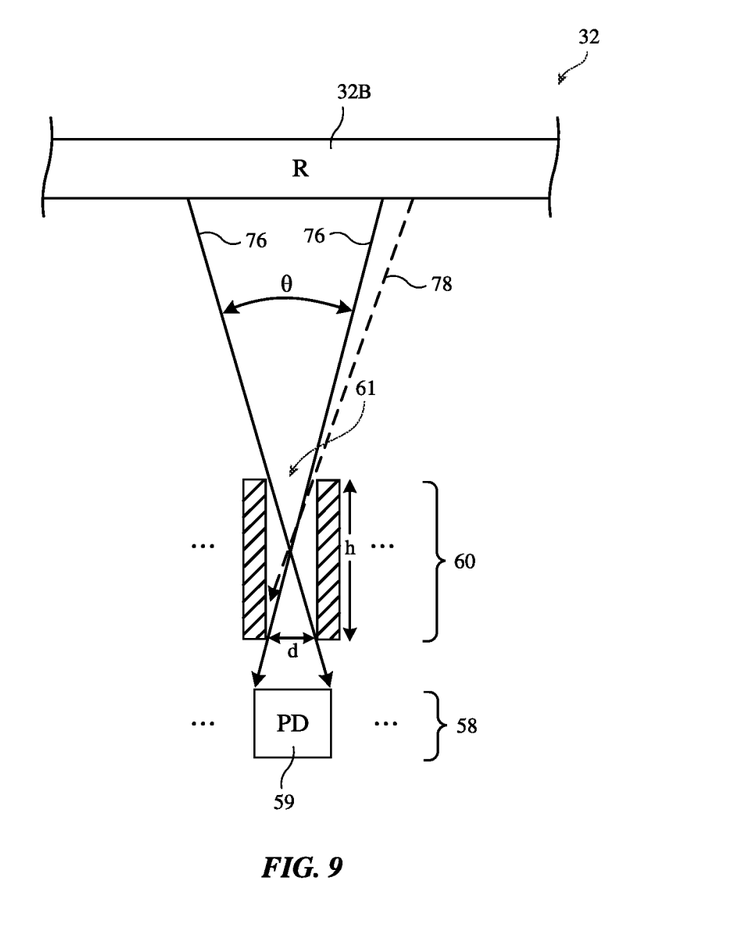
FIG. 9 is a cross-sectional side view illustrating how a field-of-view restriction filter establishes a field of view for an underlying photodetector in accordance with some embodiments.

FIG. 9 shows an example in which at least one hole 61 of the FoV restriction filter 60 is positioned over a photodetector 59 in array 58. As shown in FIG. 9, each hole 61 may have a height h and a diameter d, where height h is greater than diameter d. For example, hole height h can be at least two times hole diameter d, at least three times hole diameter d, at least four times hole diameter d, at least five times hole diameter d, two to ten times hole diameter d, or more than ten times diameter d.

Having a relatively tall and narrow hole 61 located over photodetector 59 enables filter to establish a narrow field of view as shown by field-of-view angle θ between arrows 76. Filter 60 may be configured to restrict the field-of-view angle θ to be less than 2°, less than 3°, less than 4°, less than 5°, less than 2-10°, less than 15°, less than 20°, etc. Light rays such as light ray 78 beyond the established field of view will be filtered, absorbed, or otherwise rejected by filter 60. Filter 60 configured and operated in this way is sometimes referred to as a light control film, a narrow field-of-view restriction filter, an angular filter, or an angle-of-view filter. The example of FIG. 9 in which one hole 61 is positioned over photodiode 59 is merely illustrative. The density of holes 61 in FoV restriction filter 60 can be selected to produce the desired field of view for each photodetector 59.

Figure 10:
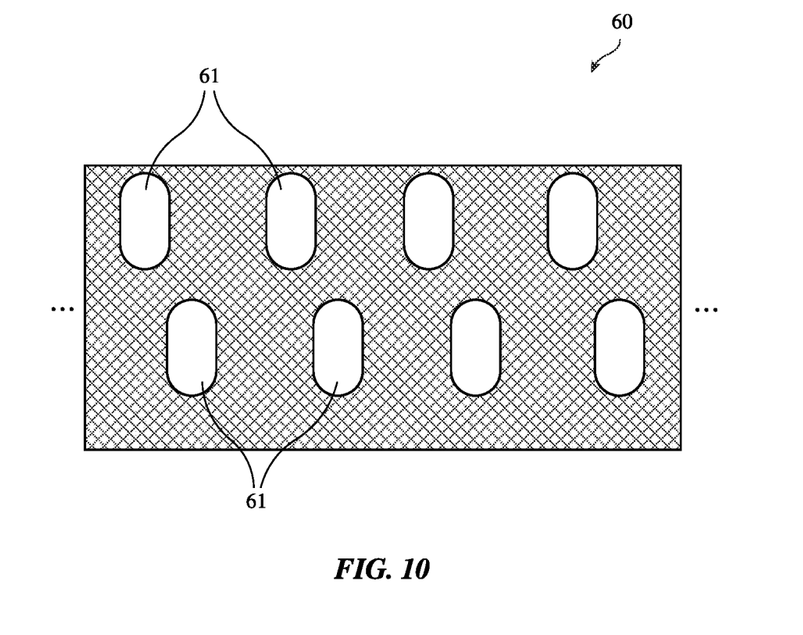
FIG. 10 is a top (plan) view of an illustrative field-of-view restriction filter in accordance with some embodiments.

FIG. 10 is a top (plan) view of illustrative field-of-view restriction filter 60 in accordance with some embodiments. As shown in FIG. 10, FoV restriction filter 60 may be constructed from a black plate, black polymer sheet, or other opaque layer (film) that has been perforated with holes (through holes) 61. Each of the holes 61 can be a narrow cylindrical hole, a lozenge shaped hole, an oval hole, an elliptical hole, an elongated oval hole with curved and straight walls (as shown in FIG. 10), or can have other suitable shapes. If desired, these holes through which parallel light rays are allowed to pass through to the underlying photodetector can be constructed using louvers or microlouvers. Each hole 61 can correspond to one or more underlying photodetectors. Alternatively, two or more holes 61 can correspond to the same underlying photodetector. The example of FIG. 10 in which filter 60 has two rows of holes 61 is merely illustrative. If desired, FoV restriction filter 60 can have only one row of holes 61 or more than two rows of holes 61.

Without FoV restriction filter 60, diffused reflections from a nearby color tag would ordinarily form a blurry, unrecoverable image on the array of photodetectors. With FoV restriction filter 60 in place, however, a 1:1 scale image of the color-coded tag can be acquired using the array of photodetectors to enable reading of discrete color blocks. This allows device 10 accurately read the color tag in the attached item and to determine a unique identifier for that item. The control circuitry within device 10 can then look up the unique identifier in a lookup table in firmware or other database to precisely identify the type of external item that has been attached, mated, or otherwise coupled to device 10.

Figure 11:
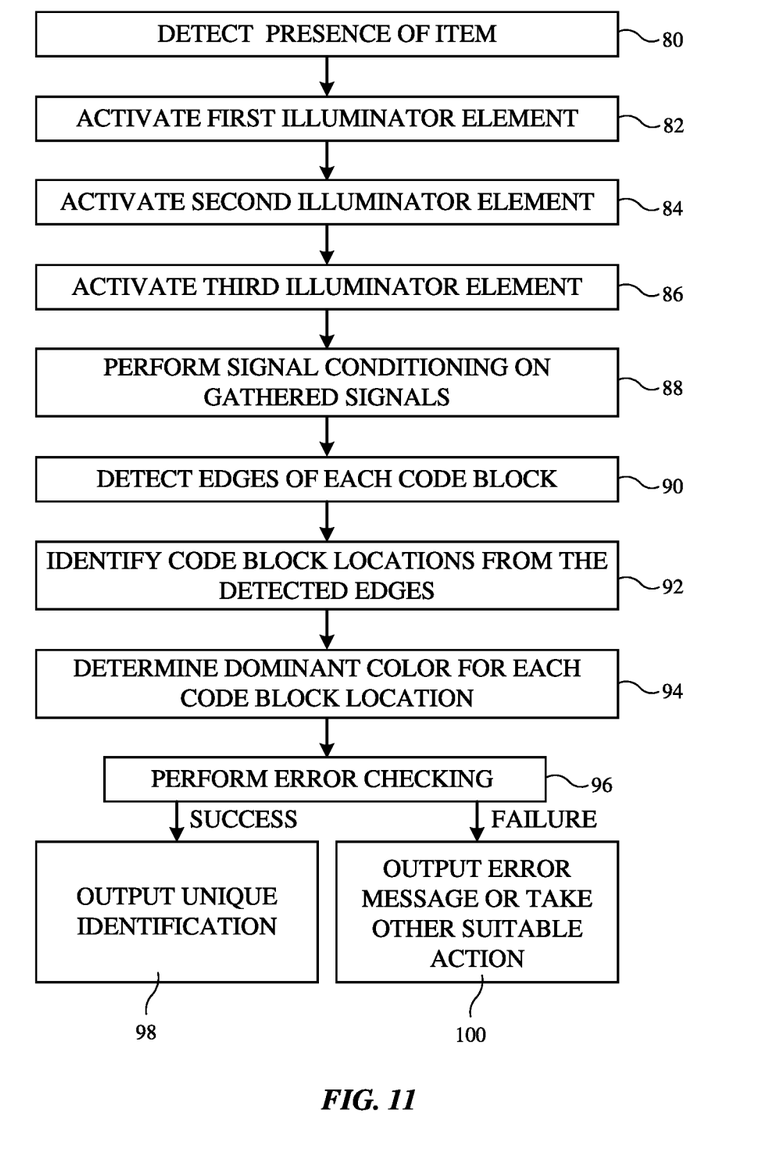
FIG. 11 is a flow chart of illustrative steps for operating an optical identification sensor in an electronic device to identify an external item in accordance with some embodiments.

FIG. 11 is a flow chart of illustrative steps for operating optical identification sensor 16 of the type described in connection with FIGS. 1-10 in accordance with some embodiments. During the operations of block 80, optical identification sensor 16 can be used to detect the presence of external item 30. For example, sensor 16 may use a dedicated presence sensor (e.g., proximity sensor 68 of FIG. 5) to determine whether item 30 has been attached to device 10. If no item has been detected, then sensor 16 will stay idle. In response to detecting that an item has been brought into close proximity with device 10 (e.g., when the external item has been mated with or attached to device 10), the presence sensor will trigger light source 66 to begin illuminating the tag in the external item.

Light source 66 may include emitters of different colors (wavelengths) that can be sequentially turned on to illuminate the color-coded tag in the external item. During the operations of block 82, a first emitter in light source 66 (e.g., a red emitter element) may be activated while the photodetector array acquires a first image by sensing the corresponding light rays reflecting back from the tag. During the operations of block 84, a second emitter in light source 66 (e.g., a green emitter element) may be activated while the photodetector array acquires a second image by sensing the corresponding light rays reflecting back from the tag. During the operations of block 86, a third emitter in light source 66 (e.g., a blue emitter element) may be activated while the photodetector array acquires a third image by sensing the corresponding light rays reflecting back from the tag. Sequentially activating emitters of different colors obviates the need for color filters to be formed on the array of photodetectors.

During the operations of block 88, processing circuitry (e.g., processing circuitry in sensor 16 or in control circuitry 20 of device 10) can be used to perform signal conditional on the acquired images. For example, the processing circuitry can perform calibration, color correction, gain correction, or other signal adjustments to the acquired images.

During the operations of block 90, the processing circuitry can sum (combine) the three images to detect edges of each color block (e.g., to locate the center and boundaries of each color block). During the operations of block 92, the processing circuitry can identify individual color (code) block locations from the edges detected during step 90. During the operations of block 94, the processing circuitry can then determine the dominant color for each color block location (e.g., to determine whether the dominant color of each code block is red, green, blue, red-green, red-blue, or green-blue). If desired, code blocks without a dominant color may be flagged for erasures (e.g., black code blocks and/or white code blocks may be omitted from consideration for the final identifier computation).

During the operations of block 96, the processing circuitry can perform error checking. To support error checking function, the code tag should include error correction features such as checksum information, cyclic redundancy checking (CRC) information, and/or error correcting code (ECC) information at the expense of address space. If no error has been found, then the processing circuitry may output a corresponding unique identifier that precisely identifies the external item (see step 98). If an error has been found, then the processing circuitry may output an error message to the user, correct the error, or take other suitable action (see step 100).

The operations of FIG. 11 are merely illustrative. At least some of the described operations may be modified or omitted; some of the described operations may be performed in parallel; additional processes may be added or inserted between the described operations; the order of certain operations may be reversed or altered; the timing of the described operations may be adjusted so that they occur at slightly different times, or the described operations may be distributed in a system.

The foregoing is merely illustrative and various modifications can be made to the described embodiments. The foregoing embodiments may be implemented individually or in any combination.

| Table of Reference Numerals | | | |
|---|---|---|---|
| 10 | Electronic device | 14 | Display |
| 16 | Sensor(s) | 18 | Other |
| 20 | Control circuitry | 22 | Communications circuitry |
| 24 | Input-output devices | 30 | Item |
| 32 | Identification tag | 12, 40 | Housing |
| R | Recess | 42 | Protective cover layer |
| 32B | Color block | 54 | Walls |
| 56 | Filter later | 58 | Photodetector array |
| 60 | Field-of-view restriction filter | 62, 64, 78 | Light rays |
| 66 | Light source | 68 | Presence sensor |
| 50 | Aperture window | 52 | Printed circuit board |
| 70 | Emitter | 72 | Support layer |
| 73, 75 | Light coverage | 74 | Light diffusing layer |
| 59 | Photodetectors | 61 | Holes |
| 76 | Arrows | θ | Field-of-view angle |
| d | Diameter | h | Height |
| 80, 82, 84, 86, 88, 90, 92, 94, 96, 98, 100 | Blocks | | |

What is claimed is:

1. An electronic device comprising:
   a housing;
   a display in the housing; and
   an optical identification sensor that comprises
      a light source configured to emit light that illuminates an external object,
      a light diffusing layer disposed over the light source,
      an array of photodetectors configured to receive the light reflecting back from the external object through a portion of the housing, and
      an opaque layer having a plurality of openings disposed over the array of photodetectors.

2. The electronic device of claim 1, wherein each photodetector in the array of photodetectors is overlapped by more than one of the plurality of openings in the opaque layer.

3. The electronic device of claim 1, wherein each opening in the plurality of openings in the opaque layer is overlapped by more than one of the photodetectors in the array of photodetectors.

4. The electronic device of claim 1, wherein each photodetector in the array of photodetectors is aligned with a respective one of the plurality of openings in the opaque layer.

5. The electronic device of claim 1, wherein the external object is removably attached to the housing of the electronic device.

6. The electronic device of claim 5, wherein the optical identification sensor and the external object are separated by a distance less than 5 millimeters when the external object is attached to the housing of the electronic device.

7. The electronic device of claim 1, wherein the external object comprises a color-coded tag having a plurality of color blocks on a substrate.

8. The electronic device of claim 1, wherein the light source comprises a plurality of emitters, further comprising:
control circuitry configured to sequentially activate the plurality of emitters to illuminate the external object.

9. The electronic device of claim 1, wherein the optical identification sensor further comprises a presence sensor configured to detect when the external object is attached to the electronic device.

10. An electronic device comprising:
a housing;
a display in the housing; and
an optical identification sensor that comprises
a light source configured to emit light that illuminates an accessory, wherein the accessory is removably attached to the electronic device,
an array of photodetectors configured to receive the light reflecting back from the accessory through a portion of the housing, and
an opaque layer having a plurality of holes disposed over the array of photodetectors.

11. The electronic device of claim 10, wherein the accessory comprises a color-coded tag having a plurality of color blocks on a substrate.

12. The electronic device of claim 10, wherein the optical identification sensor and the accessory are separated by a distance less than 5 millimeters when the accessory is attached to the electronic device.

13. The electronic device of claim 10, wherein the optical identification sensor further comprises a light scattering layer disposed over the light source.

14. The electronic device of claim 10, wherein the optical identification sensor further comprises a light diffusing layer disposed over the light source.

15. The electronic device of claim 10, wherein the optical identification sensor further comprises a diffusive light pipe disposed over the light source.

16. An electronic device comprising:
a housing;
a display in the housing; and
an optical sensor that comprises
a light source configured to emit light that illuminates an external item,
an array of photodetectors configured to receive the light reflecting back from the external item through a portion of the housing, and
an opaque layer having a plurality of openings disposed over the array of photodetectors, wherein the optical sensor and the external item are separated by a distance that is less than 5 millimeters when the external item is on the housing of the electronic device.

17. The electronic device of claim 16, wherein the optical sensor further comprises:
a light diffusing layer or a light scattering layer disposed over the light source.

18. The electronic device of claim 16, wherein the external item comprises an accessory having a color-coded tag with a plurality of color blocks.

19. The electronic device of claim 16, wherein the external item is removably attached to the housing of the electronic device.

20. The electronic device of claim 16, wherein the light source comprises a plurality of emitters, further comprising:
control circuitry configured to sequentially activate the plurality of emitters to illuminate the external item.

* * * * *